H. S. CAIRNS.
FISHING TOOL FOR USE IN WELL BORING.
APPLICATION FILED SEPT. 12, 1917.

1,336,815.

Patented Apr. 13, 1920.

Inventor:
Hugh Slade Cairns
by Frank T. Wentworth
his Attorney

UNITED STATES PATENT OFFICE.

HUGH SLADE CAIRNS, OF YENANGYAUNG, UPPER BURMA, INDIA.

FISHING-TOOL FOR USE IN WELL-BORING.

1,336,815.

Specification of Letters Patent.    Patented Apr. 13, 1920.

Application filed September 12, 1917. Serial No. 190,991.

*To all whom it may concern:*

Be it known that I, HUGH SLADE CAIRNS, a subject of the King of Great Britain and Ireland, residing at Indo-Burma Petroleum Company, Yenangyaung, Upper Burma, India, have invented Improvements in Fishing-Tools for Use in Well-Boring, of which the following is a specification.

This invention relates to fishing tool for use in well drilling, the object being to provide a tool for picking up under reamer dogs, strips or other small objects which may be lost in bore holes during the process of well boring and more particularly drilling for petroleum.

My invention consists of a fishing tool capable of being screwed to the drilling stem, and so arranged that its two jaws caused to close by the action of a strong spring and normally kept open by trip mechanism will, upon coming to the bottom of the bore hole, and over the object to be picked up, be released by the trip mechanism so as to allow the spring to act and close them on the said object.

Figure 1:
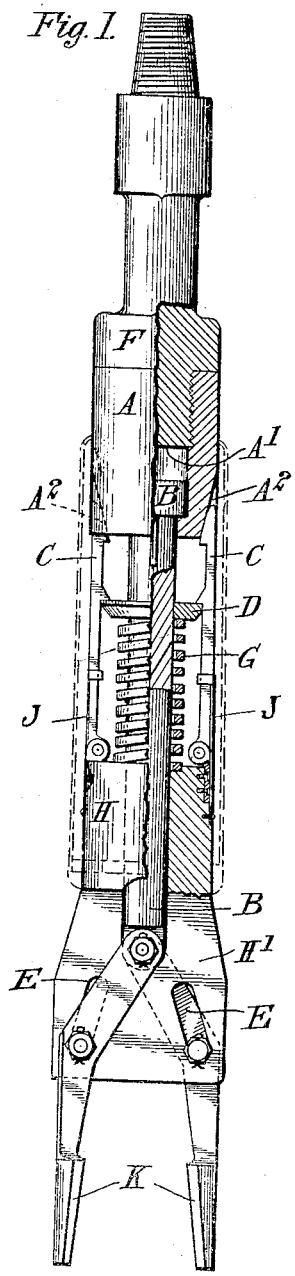
Figure 2:
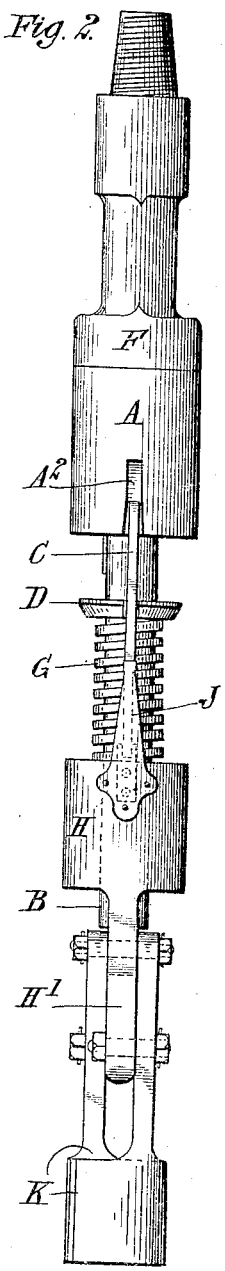

In the accompanying drawings Figure 1 is a part sectional elevation and Fig. 2 a side elevation showing my fishing tool in the position after the spring has been compressed ready for lowering into the bore hole.

When the spring is compressed, as shown, the two trip rods C catch over the steel ring D. These rods may be of spring steel, or they may be hinged to the sliding body H as shown, in which case flat springs J will be required to keep them against the steel ring.

The grab jaws K being open, the fishing tool is lowered into the bore hole and when the bottom is reached and the jaws are over the object to be picked up, the mandrel box A slides down until the lower end A' of the intermediate piece or "substitute" F, which is screwed into the mandrel box A comes to rest on the top of the mandrel head B. The trip rods C are at the same time thrown out of hold on the steel ring D by the inclined ways A² of the mandrel box A thus releasing the spring G which pushes down the sliding body H and by means of the diagonal slots E in the flat sided part H' of the sliding body H the jaws K close inward on the object to be picked up and take firm hold.

The fishing tool is then pulled up, the mandrel box coming again into the position shown on the drawing and taking the weight of the mandrel, sliding body H, and the object grasped by the jaws.

If the object in the bore hole should be difficult to get at, on account of "cavings" lying on the top of object, and the weight of the fishing tool is not sufficient to penetrate the "cavings" before reaching the object, thereby causing the fishing tool to trip, a suitable steel spring may be inserted between the steel ring D and the mandrel box A, so that some of the weight of the drilling stem will be transmitted through the said steel spring to force the jaws into the "cavings" before the spring G is released by the trip rods. A stronger spring may be placed within the said mandrel box A and between the "substitute" F and mandrel head B, than can be inserted between the mandrel box and the steel ring D and the latter arrangement is preferred.

The working parts in the vicinity of the spring G may be advantageously covered in by a pipe screwed at its lower end to a collar on the cylindrical part of the sliding body H and swaged inward at its top to make a sliding fit with the plain part of the mandrel box A.

The fishing tool may also be used without the tripping device, by inserting a block of wood between the jaws, which is pushed out by the object to be picked up.

Claim:

A fishing tool comprising an intermediate piece adapted for being fixed to a drilling stem, a mandrel box having an inclined way and fixed to the said intermediate piece, a sliding body having a flat sided end; a mandrel head capable of movement in the said mandrel box, a steel ring on said mandrel head near its upper end, a pair of jaws having arms pivoted to the lower end of said mandrel head, a spring between the sliding body and said steel ring, a trip rod secured to the said sliding body and adapted to engage the steel ring when the spring is compressed between the said steel ring and the sliding body and also adapted to release said spring when the said inclined way of the mandrel box moves downward in contact with the end of the trip rod, diagonal slots in the flat sided end of the sliding body and bolts in the arms of the jaws arranged to slide in the slots so that the jaws are pressed inwardly by the action of the spring when released.

HUGH SLADE CAIRNS.

Witnesses:
P. HARROLD,
W. L. BRYAN.